United States Patent
Cheng et al.

(10) Patent No.: US 11,044,606 B2
(45) Date of Patent: *Jun. 22, 2021

(54) USER ACCESS VERIFICATION

(71) Applicant: International Business Machines Corporation, Armonk, NY (US)

(72) Inventors: Kangguo Cheng, Schenectady, NY (US); Shawn P. Fetterolf, Cornwall, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/877,605

(22) Filed: Jan. 23, 2018

(65) Prior Publication Data

US 2018/0160308 A1 Jun. 7, 2018

Related U.S. Application Data

(63) Continuation of application No. 15/289,455, filed on Oct. 10, 2016, now Pat. No. 9,942,761.

(51) Int. Cl.
*H04W 12/08* (2021.01)
*H04W 72/04* (2009.01)
(Continued)

(52) U.S. Cl.
CPC ......... *H04W 12/08* (2013.01); *H04L 63/0861* (2013.01); *H04L 63/10* (2013.01); *H04W 64/00* (2013.01); *H04W 72/0453* (2013.01)

(58) Field of Classification Search
CPC .. H04W 12/06; H04W 12/08; G06F 221/2111
See application file for complete search history.

(56) References Cited

U.S. PATENT DOCUMENTS

| 4,766,516 A | 8/1988 | Ozdemir et al. |
| 5,117,457 A | 5/1992 | Comerford et al. |

(Continued)

FOREIGN PATENT DOCUMENTS

| CN | 201207189 Y | 3/2009 |
| CN | 201993771 U | 9/2011 |

(Continued)

OTHER PUBLICATIONS

Kangguo Cheng, et al., Pending U.S. Appl. No. 15/289,455 entitled "User Access Verification," filed with the U.S. Patent and Trademark Office Oct. 10, 2016.

(Continued)

*Primary Examiner* — Dao Q Ho
(74) *Attorney, Agent, or Firm* — Cantor Colburn LLP; Robert Sullivan

(57) ABSTRACT

Embodiments are directed to a method of providing access verification for a system that includes activating a security control device, which is in communications with a host device. The method also includes having the security control device receiving a verification signal coming from outside the system while being locally-based, and comparing the verification signal to a table of stored criteria values. The device then chooses a response based on that comparison and sends an access determination signal based on the response.

10 Claims, 6 Drawing Sheets

(51) Int. Cl.
*H04W 64/00* (2009.01)
*H04L 29/06* (2006.01)

(56) References Cited

U.S. PATENT DOCUMENTS

| | | | |
|---|---|---|---|
| 5,369,299 | A | 11/1994 | Byrne |
| 5,406,261 | A | 4/1995 | Glenn |
| 6,142,411 | A | 11/2000 | Cobleigh |
| 6,166,688 | A | 12/2000 | Cromer et al. |
| 6,223,290 | B1 | 4/2001 | Larsen et al. |
| 6,414,884 | B1 | 7/2002 | DeFelice et al. |
| 6,438,825 | B1 | 8/2002 | Kuhn |
| 8,164,171 | B2 | 4/2012 | Lin et al. |
| 8,455,990 | B2 | 6/2013 | Warren et al. |
| 8,503,186 | B2 | 8/2013 | Lin et al. |
| 8,578,469 | B2 | 11/2013 | Thiagarajan |
| 8,759,950 | B2 | 6/2014 | Kamgaing et al. |
| 8,804,360 | B2 | 8/2014 | Lin et al. |
| 9,942,761 | B1 | 4/2018 | Cheng et al. |
| 2008/0313725 | A1* | 12/2008 | Thiagarajan ............ G06F 21/35 726/9 |
| 2009/0124234 | A1* | 5/2009 | Fisher ................ G06Q 20/32 455/406 |
| 2009/0253410 | A1 | 10/2009 | Fitzgerald et al. |
| 2011/0242967 | A1 | 10/2011 | Starr |
| 2012/0144470 | A1* | 6/2012 | Kim ..................... G06F 21/31 726/7 |
| 2013/0292849 | A1 | 11/2013 | Lin et al. |
| 2014/0189811 | A1* | 7/2014 | Taylor ................. H04W 12/06 726/4 |

FOREIGN PATENT DOCUMENTS

| | | |
|---|---|---|
| CN | 203134003 U | 8/2013 |
| CN | 203215917 U | 9/2013 |
| CN | 205179170 U | 4/2016 |
| JP | 2002236619 A | 8/2002 |

OTHER PUBLICATIONS

List of IBM Patents or Patent Applictions Treated as Related; (Appendix P), Filed Jan. 23, 2018, 2 pages.

\* cited by examiner

USER ACCESS VERIFICATION

DOMESTIC AND/OR FOREIGN PRIORITY

This application is a continuation of U.S. application Ser. No. 15/289,455, titled "USER ACCESS VERIFICATION" filed Oct. 10, 2016, the contents of which are incorporated by reference herein in its entirety.

BACKGROUND

The present invention relates in general to security systems, and more specifically to methods and systems for verifying that a potential user is authorized to access a particular item or system.

The phrase "access control" refers generally to security techniques that are used to regulate who or what can view or use resources. In some configurations of an access control of a system, an integrated circuit security system controls access by comparing external signals received by the system to a known list of signals and determining whether to allow access based on the comparison. In many fields, access to technology, including semiconductor devices, integrated circuits, computer systems, and the like, are restricted from unauthorized use. As an example, the export of sensitive technologies to selected locations is severely limited by many governments. However, if such a technology makes its way into a restricted region, there is little that can be done once it arrives.

SUMMARY

Embodiments are directed to a method of providing access verification for a system. The method includes activating a security control device, which communicates with a host device. The security control device then receives a verification signal that comes from outside the system and is locally-based, where the device compares the verification signal to a table of stored criteria values. The security control device then chooses a response based on the comparison, and sends out an access determination signal based on the response.

Embodiments are also directed to a system for providing access verification. The system includes a security control device which communicates with a host device. Additionally, a verification signal, which originates from outside the system, is sent to a processor located within the security control device. The processor compares the verification signal to a table of stored criteria values. The processor then chooses a response based on the comparison, and generates an access determination signal based on the response.

BRIEF DESCRIPTION OF THE DRAWINGS

The subject matter of the present invention is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
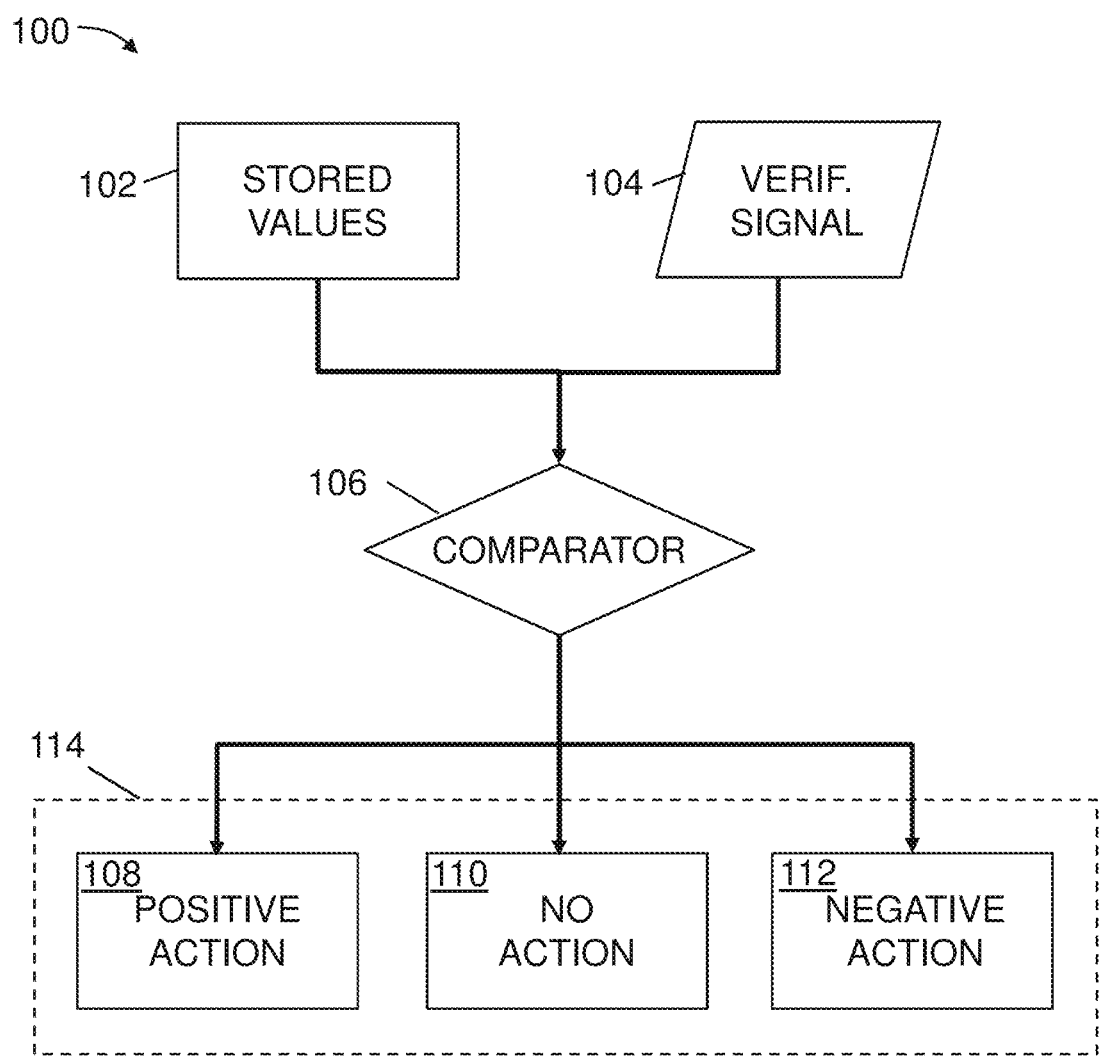
FIG. 1 depicts a flowchart showing the steps of verifying the validity of a system according to one or more embodiments of the present invention.

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one and more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements. It should be noted that the term "selective to," such as, for example, "a first element selective to a second element," means that the first element can be etched and the second element can act as an etch stop.

Turning now to an overview of the present invention, one or more embodiments provide a method for verifying a user's authorized access to a system using verification signals that are locally-based, yet are external to the system. The verification signals can include global positioning satellite system (GPS) signals, internet protocol (IP) address, local FM radio station signals, etc. Also, authorized access to a system can require a plurality of verification signals to be present at the same time in order to grant access. One or more embodiments are also shown for an access control device to be positioned within a host device at one location, or distributed throughout the host device to deter reverse engineering attempts. The host device can be an integrated circuit (IC) with a security control device co-located on the IC and fabricated with the same die as the host control device.

Figure 5:
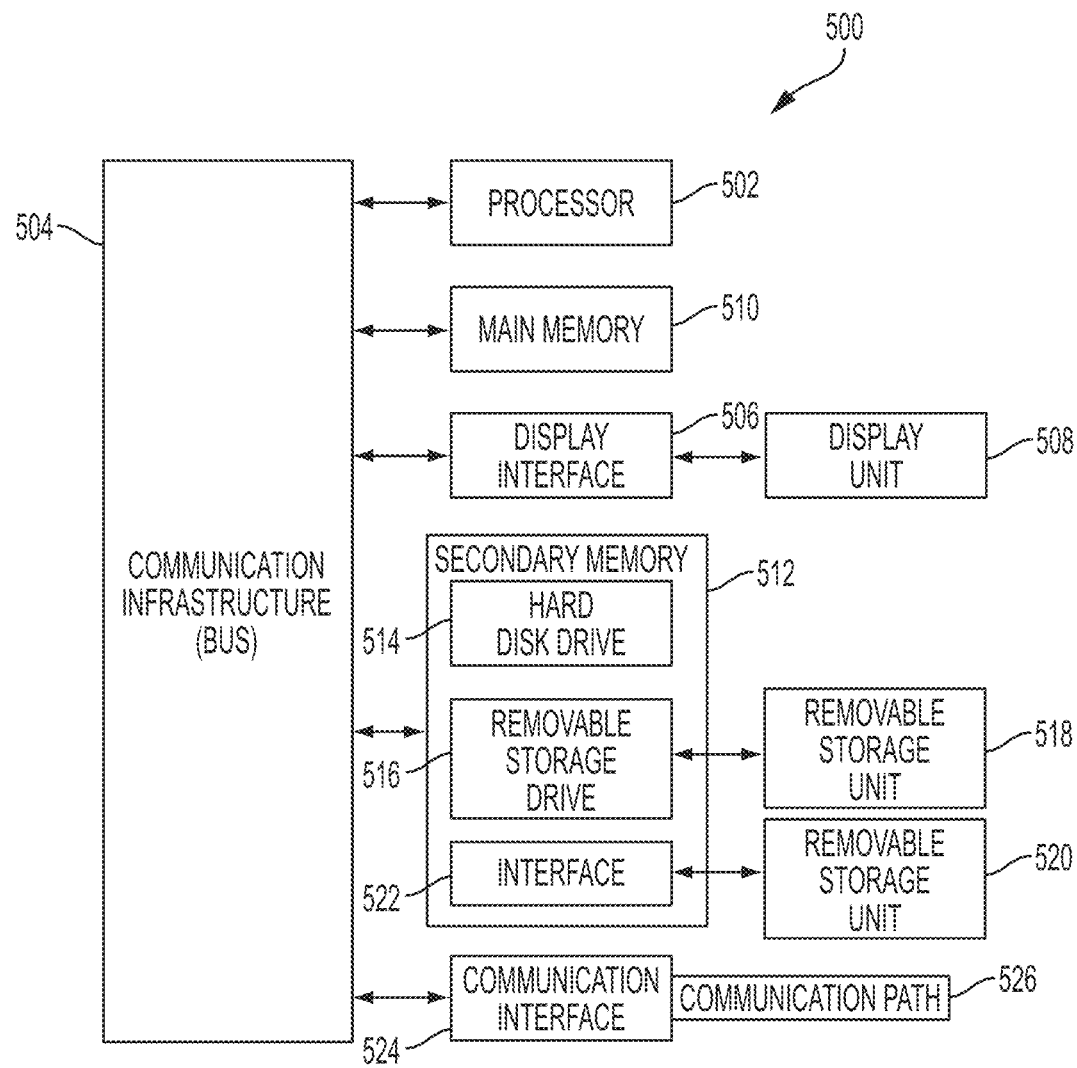
FIG. 5 depicts a high-level block diagram of a computer system according to one or more embodiments of the present invention.

Turning now to a more detailed description of embodiments of the present invention, FIG. 1 depicts a flowchart showing a signal verification process 100 that verifies the validity of a system utilizing a security control device according to one or more embodiments of the present invention. The system 100 can include, but is not limited to, a computer system, a cell phone, a hard drive, an integrated circuit, or any other device, electronic or mechanical, that requires protection from unauthorized users. The process 100 provides stored criteria values (or stored values) 102 and an external verification signal 104 to a comparison process 106, which generates one or more responses 114. A response 114 can be one or more individual groups of processes. In some embodiments, there are displayed three response groups: a positive action response 108, a no action response 110, and a negative action response 112. In some embodiments, process 100 is executed by a computer or other processor such as the computer system 500, which is shown in FIG. 5 and described in more detail later herein.

In some embodiments, the verification signal 104 can include a plurality of signals such as GPS signals, IP addresses, FM transmissions, etc., all of which need to be present in order for the security control device to generate a positive response 108. In a similar manner, in a process 100 that is configured to look for four different verification signals 104, the presence of only three signals can trigger a negative, positive, or no response from the security control circuit. A characteristic of the verification signal(s) 104 is that it is a locally available signal that can be processed to derive the current location of a device that receives the local signal. For example, an FM transmission from a local broadcast can be processes to identify that a receiver that has received that particular FM transmission is likely to be in a particular location. In embodiments that require the presence of multiple types of verification signals 104, an extra level of security is provided against an unauthorized user mimicking some but not all of the required verification signals 104. Additionally, the particular combination of verification signals 104 can be selected to match a particular region. For example, if it is known that location "A" has limited FM transmissions, the combination of verification signals 104 used for location A would not include FM transmissions but would instead use another local signal that is more reliably present in location A.

In some embodiments, stored values 102 can include, but are not limited to, a list of data derived from signals including GPS locations, a set of IP addresses, a list of radio frequency (RF) transmissions, or other data derived from signal sources. The stored values 102 can be include data derived from one or more approved signals, whereupon access can be granted. Similarly, the list of stored values 102 can also include a list of data derived from non-approved signals, which would trigger a negative response 112.

The comparator process 106 can decide to take no action when receiving a valid or invalid verification signal 104. During operations, a security control device 158 (shown in FIG. 2) processes the incoming verification signal 104 and converts the signal(s) to a data stream format. As previously described, the verification signal 104 can be a GPS signal received over a local receiver, IP addresses that are derived from a wired or wireless internet connection to the system 152, a list of RF transmissions received by the system 152 when activated, or other locally received data that can be processed to identify the location of the device that received it.

Comparator block 106 is configured to compare the stored values 102 with the data stream derived from the verification signal 104. The data stream values can, but are not required to, include a range or variation of values to accommodate small data errors or random noise in receiving and processing the verification signal 104. The comparison process 106 can be, but is not required to, located within the computer system 500 (shown in FIG. 5). The output of the comparison process 106 is an "approved/not approved" signal. In some embodiments, the comparator 106 mathematically weighs each data stream, compares it to the stored values 102, and makes a determination whether to accept the verification signal 104 as sufficient and generate the "approved" signal. Likewise, if the comparator 106, after weighing the stored values 102 with the data stream derived from the verification signal 104, determines that the signal is insufficient, it will generate a "not approved" signal, which is sent to the security control device 158 for action. Based on the results of the comparison, the security control device 158 chooses at least one action and generates a response signal back to the system 152 (shown in FIG. 2). The response can be a positive action response 108, a no action response 110, or a negative action response 112. A positive action response 108 can be, but is not limited to, generating an enable signal, activating a circuit, or allowing functionality of elements of the system. Alternately, another response can be a no action response 110, wherein the security control system does nothing or otherwise does not impede the normal operation of the system. Finally, a negative action response 112 can be a destruct signal, an erase signal, a disable signal, etc. that is sent to the system to disable the system from functioning properly.

The disablement of the system by a negative action response 112 can be temporary or permanent. A temporary disablement can be a momentary denial of access to a host device (as described in FIG. 2), or allowing only a reduced set of functions of the system to be accessed by an operator. Meanwhile, a permanent disablement can mean physically damaging the device wherein no further use by an operator is possible. A temporary disablement can include, but is not limited to, disabling the power system, internet connection, drive access, or input/output of the host device, where only the reception of a valid verification signal 104 will allow access to the system. A permanent disablement can include, but is not limited to, clearing the contents of the memory or drive storage, physical damaging the processor or other critical component of the host device, locking out access, etc. in order to prevent any use of the device. A permanent disablement of the system can mean that no further access to the system is possible, even after ensuring a valid verification signal 104 is present at a later date.

Figure 2:
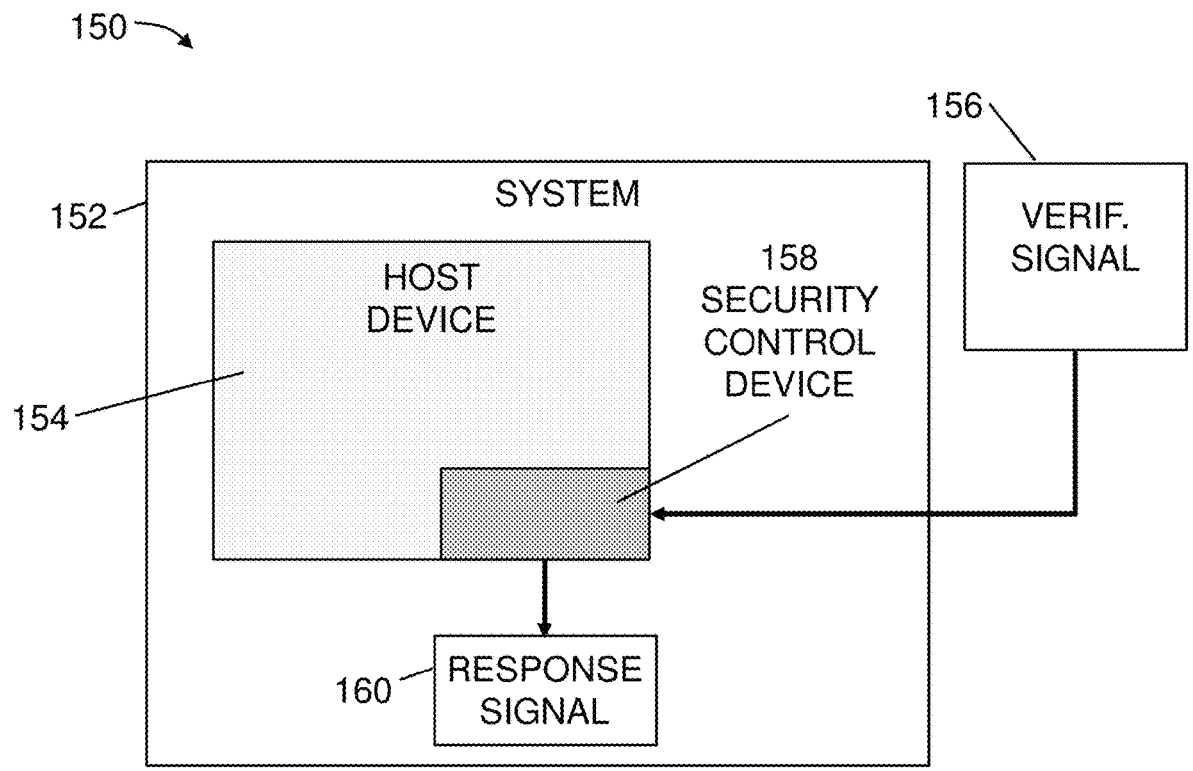
FIG. 2 depicts a block diagram of an integrated circuit using a security control device formed from multiple dies according to one or more embodiments of the present invention.

FIG. 2 depicts a block diagram of an access controller 150 embodying features of the present invention. The access controller 150 can be included in an IC (not shown). The access controller 150 includes a system 152, a host device 154, an external verification signal 156, a security control device 158, and a response signal 160, configured and arranged as shown. The system 152 can be an electronic or mechanical system configured to receive external signals such as a verification signal 156. In some embodiments, the system is a processor-based device such as a computer, tablet, microprocessor, or cell phone. In other embodiments, the system 152 can be a vehicle or a dwelling. In the present embodiment, the host device 154 is an IC and can contain a processor and an operating system as described in FIG. 5. The security control device 158 derives a data stream from the received verification signal 156 and makes a comparison with the stored values 102 (of FIG. 1). The stored values 102 can be located within the security control device 158, within the host device 154, or within the system 152. Based on the comparison, the security control device 158 then generates a response signal 160 to be sent to the system 152 or the host device 154. Alternately, the response signal 160 can be sent to an external location for further processing. The response signal 160 can be a positive response, a negative response, or a "no action" response as described in FIG. 1. The security control device 158 is co-located on an IC substrate (not shown) with the host device 154. During the fabrication of the IC, the host device 154 and the security control device 158 can be formed from multiple die and are physically distinct from one another on the IC.

In the present embodiment, the security control device 158 contains an embedded antenna within the die. In some embodiments, RFID technology is used for receiving or processing verification signals 156. In some embodiments, the security control device 158 is a standalone device that is either located near the host device 154 or the system 152.

Figure 3:
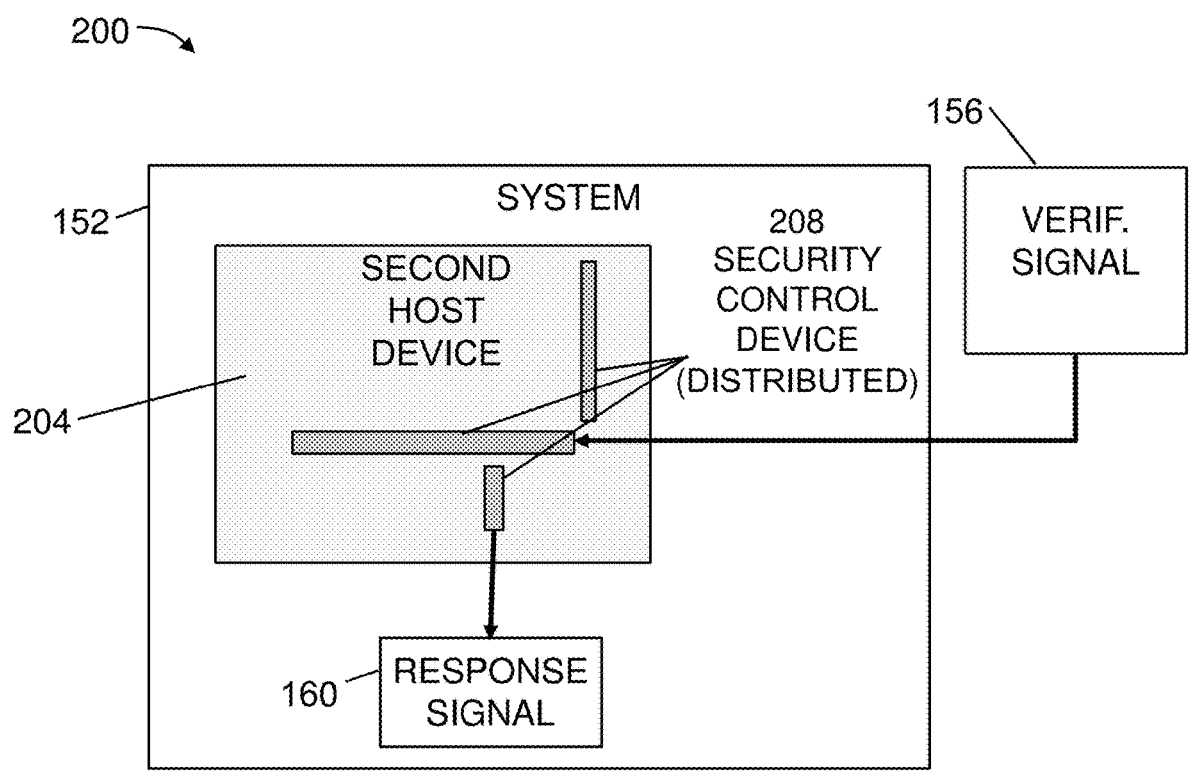
FIG. 3 depicts a block diagram of an integrated circuit using a security control device formed from a single die according to one or more embodiments of the present invention.

FIG. 3 depicts a block diagram of an integrated circuit 200 using a security control device formed from a single die according to one or more embodiments of the present invention. Elements of integrated circuit 200 are similar in function as those found in FIG. 2. The integrated circuit 200 includes a system 152, a second host device 204, an external verification signal 156, a distributed security control device 208, and a response signal 160. However, in this embodiment, the distributed security control device 208 has been distributed and is fully integrated with the host device 204, thus making both devices co-located on the IC. This co-location of the second host device 204 and the distributed security control device 208 allows for enhanced security as it is difficult to distinguish one device from another through direct or indirect observation and inspection of the device by an unwanted entity. As an example, the distributed security control device 208 can be located within memory chips or I/O chips, making detection and reverse engineering difficult. Also, during the fabrication of the IC, the second host device 204 and the distributed security control device 208 are formed from a single die and are physically integrated with one another on the IC.

Figure 4:
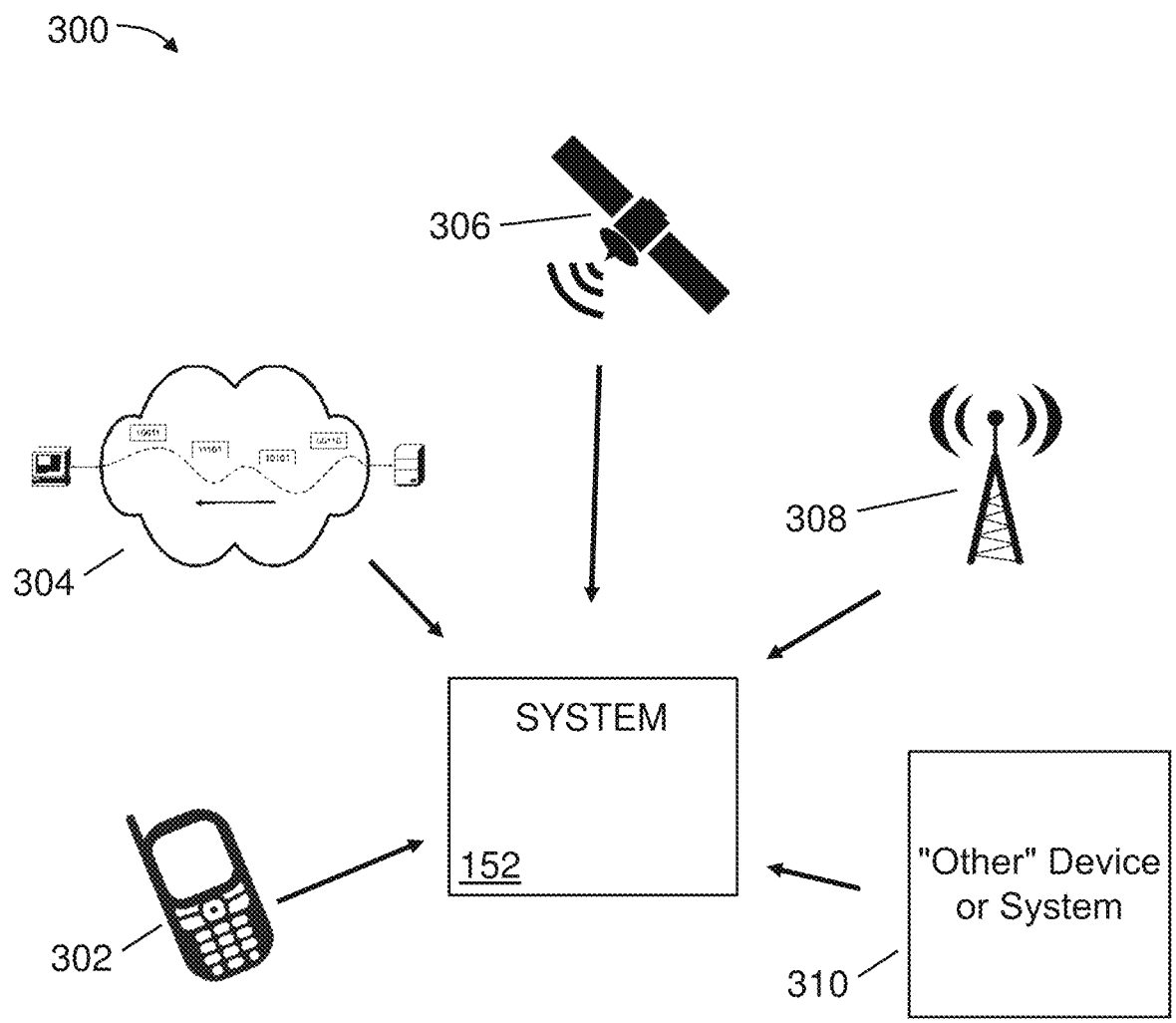
FIG. 4 depicts a diagram of various verification signals according to one or more embodiments of the present invention.

FIG. 4 depicts a diagram of various verification signals 300 according to one or more embodiments of the present invention. The verification signal 104 (of FIG. 1) is received by the system 152 (of FIG. 2). The verification signal can be, but is not limited to, a cell phone transmission 302, an IP address or signal 304, a GPS signal 306, a RF signal transmission 308, or a manual input signal 310. The cell phone transmission 302 can be, but is not limited to, a signal from an individual cell phone or a signal from a local cell tower. The IP address or signal 304 can be, but is not limited to, the IP address or signal of the system 152, a localized server address or signal, a switch address or signal, or a gateway address or signal. The RF transmission 308 can be, but is not limited to, a local AM or FM radio station, a nearby HF transmitter, or other sources of RF energy. Finally, the manual input signal 310 can be, but is not limited to, an analog or digital signal any other device or system such as an automobile, airplane, UAV, etc., or a device that requires a manual input such as a keyboard, an ATM machine, a navigation system, etc. In another embodiment, the verification signal can be any external signal that can be received by the system. The presence of a verification signal can trigger a positive action response, a negative response, or no response depending on the application being used. Thus, as an example, the presence of an unexpected or unwanted verification signal can trigger a response to shut down the system.

In another embodiment, the system 152 can be configured to look for multiple verification signals. In this embodiment, some or all of the signals received must be present in order for the security control device to generate a positive action response. As a result, if one signal is absent while other signals are present and approved, the system would still receive a "no action" or negative action response signal sent from the security control device as described in FIG. 2.

FIG. 5 depicts a high-level block diagram of a computer system 500, which can be used to implement one or more embodiments. More specifically, computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional systems are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 6:
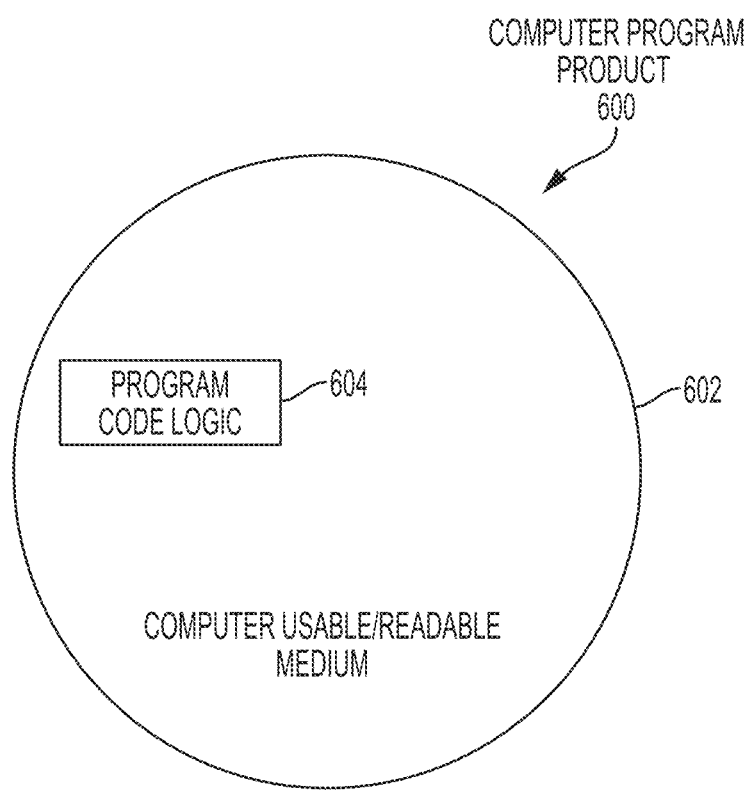
FIG. 6 depicts a computer program product that includes a computer-readable storage medium and program instructions according to one or more embodiments of the present invention.

Referring now to FIG. 6, a computer program product 600 in accordance with an embodiment that includes a computer-readable storage medium 602 and program instructions 604 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the operator's computer, partly on the operator's computer, as a stand-alone software package, partly on the operator's computer and partly on a remote computer or entirely on the remote computer or server. In the latter scenario, the remote computer can be connected to the operator's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The corresponding structures, materials, acts, and equivalents of all means or step plus function elements in the claims below are intended to include any structure, material, or act for performing the function in combination with other claimed elements as specifically claimed. The present invention has been presented for purposes of illustration and description, but is not intended to be exhaustive or limited to the form described. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the functionality and operation of possible implementations of systems and methods according to various embodiments of the present invention. In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. The actions can be performed in a differing order or actions can be added, deleted or modified. Also, the term "coupled" describes having a signal path between two elements and does not imply a direct connection between the elements with no intervening elements/connections therebetween. All of these variations are considered a part of the invention.

The terms "about," "substantially," "approximately," and variations thereof, are intended to include the degree of error associated with measurement of the particular quantity hosted upon the equipment available at the time of filing the application. For example, "about" can include a range of ±8% or 5%, or 2% of a given value.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present invention has been described in detail in connection with only a limited number of embodiments, it should be readily understood that the present invention is not limited to such described embodiments. Rather, the present invention can be modified to incorporate any number of variations, alterations, substitutions or equivalent arrangements not heretofore described, but which are commensurate with the spirit and scope of the present invention. Additionally, while various embodiments of the present invention have been described, it is to be understood that aspects of the present invention can include only some of the described embodiments. Accordingly, the present invention is not to be seen as limited by the foregoing description, but is only limited by the scope of the appended claims.

What is claimed is:

1. A method of providing access verification for a system, the method comprising:
   activating a security control device, wherein the security control device is communicatively coupled to a host device;
   selecting a particular combination of a plurality of verification signals based on a location of the security control device required for access determination,
   wherein the plurality of verification signals originate from outside the system and is locally-based, wherein the particular combination of the plurality of verification signals are present simultaneously at the location, wherein the plurality of verification signals comprises a global positioning satellite (GPS) signal, and at least one of an internet protocol (IP) signal or a radio frequency (RF) signal;
   receiving, by the security control device, the plurality of verification signals;
   comparing the particular combination of the plurality of verification signals for the location to a table of stored criteria values for the location;
   choosing a response based on the comparison, wherein the response is to send a location signal of the host device to a remote site; and
   sending an access determination signal to the system based on the response, wherein the response is to disable portions of the host device.

2. The method of claim 1, wherein the system comprises an electronic device.

3. The method of claim 1, wherein the host device comprises at least one of an electronic device or an integrated chip (IC).

4. The method of claim 1, wherein the security control device is embedded within the host device.

5. The method of claim 1, wherein the security control device is separate, distinct, and external to the host device.

6. The method of claim 1, wherein one of the plurality of verification signals includes at least one of a cell phone transmission from an individual cell phone or a signal from a local cell tower.

7. A device to provide access verification for a system, the device comprising:
   a security control device, communicatively coupled to a host device, wherein security control device is configured to select a particular combination of a plurality of verification signals based on a location of the security control device required for access determination;
   the plurality of verification signals originating from outside the system and is locally-based, wherein the plurality of verification signals comprises a global positioning satellite (GPS) signal, and at least one of an internet protocol (IP) signal or a radio frequency (RF) signal, wherein the plurality of verification signals are present simultaneously at the location;
   a table of stored criteria values located within the security control device;
   a processor, located within the security control device, wherein the processor receives the plurality of verification signals, compares the particular combination of the plurality of verification signals for the location to the table of stored criteria values for the location and chooses a response based on the comparison, wherein the response is to send a location signal of the host device to a remote site; and
   send an access determination signal to the system based on the response, wherein the response is to disable portions of the host device.

8. The device of claim 7, wherein the security control device comprises an integrated circuit (IC), physically located within the host device, wherein the host device comprises an IC and wherein the security control device is distributed throughout the IC to resist discovery via reverse engineering techniques.

9. The device of claim 7, wherein the plurality of verification signals comprises are individually compared to the table of stored criteria values.

10. A system for providing access verification, comprising:
    a host device;
    a security control device is communicatively coupled to the host device;
    the security control devices comprise a processor configured to:
    select a particular combination of a plurality of verification signals based on a location of the security control device required for access determination, wherein the plurality of verification signals originates from outside the system and is locally-based, wherein the plurality of verification signals comprises a global positioning satellite (GPS) signal, and at least one of an internet protocol (IP) signal or a radio frequency (RF) signal;
    receive the plurality verification signals;
    compare the particular combination of the plurality of verification signals for the location to a table of stored criteria values for the location;
    choosing a response based on the comparison, wherein the response is to send a location signal of the host device to a remote site; and
    generates an access determination signal based on the response, wherein the response is to disable portions of the host device.

* * * * *